3,095,442
PROCESS FOR PRODUCTION OF 1-OXO-2-NITRATOCYCLOALKANES

Wilfred John Arthur, Charleston, W. Va., assignor to E. I. du Pont de Nemours and Company, Wilmington, Del., a corporation of Delaware
No Drawing. Filed Nov. 15, 1961, Ser. No. 152,657
8 Claims. (Cl. 260—466)

This invention is concerned with a process for the preparation of 1-oxo-2-nitratocycloalkanes by the reaction of nitrogen dioxide with a solution of a cycloalkene in a saturated hydrocarbon solvent. More particularly, this invention is concerned with a process for the preparation of 2-nitratocyclohexanone from cyclohexene.

The reaction of nitrogen dioxide with cycloalkenes has been reported in the literature to give mixtures of 1,2-dinitrocycloalkanes and 2-nitrocycloalkyl alcohols. In other words, this reaction has produced compounds in which the nitrogen atom of the nitrogen dioxide becomes attached directly to a carbon of the ring.

It is the object of this invention to provide a novel process for the reaction of cycloalkenes with nitrogen dioxide which will produce novel 1-oxo-2-nitratocycloalkanes rather than the nitro compounds previously found from the reaction of these materials. It is a particular object of this invention to provide a process for the oxidation of cyclohexene with nitrogen dioxide which will avoid the production of nitro compounds. Other objects and advantages of this invention will appear hereinafter.

In accordance with the objects of this invention, it has been found that 1-oxo-2-nitratocycloalkanes can be prepared by a process which comprises mixing nitrogen dioxide with a solution of a cycloalkene in a saturated, hydrocarbon reaction medium at a temperature in the range of $-15°$ to $+25°$ C. In preferred processes according to this invention, nitrogen dioxide may be dissolved in another portion of the saturated hydrocarbon reaction medium prior to addition of the solution of the cycloalkene.

A particularly useful embodiment of this invention is the reaction of cyclohexene with nitrogen dioxide under the conditions of the process of this invention whereby 1-oxo-2-nitratocyclohexane, sometimes designated herein as 2-nitratocyclohexanone, is obtained.

Under the conditions of the process of this invention, the reaction of nitrogen dioxide with the cycloalkene partakes of the nature of an oxidation process rather than the usual nitration process. An essential aspect of the process of the invention is the use of a saturated hydrocarbon reaction medium. The reaction product is found to be immiscible with the hydrocarbon reaction medium and separates as a lower layer.

Although the reaction may be carried out by direct addition of nitrogen dioxide to a solution of cycloalkene in a saturated hydrocarbon or by the addition of a solution of cycloalkene in a saturated hydrocarbon to a solution of nitrogen dioxide in the solvent, or by any other combination of the solvent and reactants, better control of the reaction and a more stable product appear to be obtained by the controlled addition of a solution of the cycloalkene, preferably of about 45% by volume concentration, in the hydrocarbon solvent to a cooled and stirred solution of $NO_2$ in the same solvent. Usually about 3 volumes of liquid nitrogen dioxide are employed to 4 volumes of the hydrocarbon solvent, and the process is carried out in the presence of an excess of nitrogen dioxide.

The addition of a small stream of air or oxygen-containing gas to the reacting mixture during the reaction allows more efficient use to be made of the $NO_2$. While the reaction may be carried out over a temperature in the range of $-15°$ to $+25°$ C., it is most readily controlled in the temperature range of $-5°$ to $+5°$ C. during the mixing of the ingredients. In the final stages of reaction, the mixture may be allowed to warm to 25° C.

Removal of the reaction product is readily accomplished by decantation and removal of the lower layer which may be substantially freed of entrapped or dissolved hydrocarbon reaction medium and nitrogen dioxide by being subjected to reduced pressure, for example 20 mm. of mercury, at 25–35° C.

The product of the process of this invention after removal of dissolved $NO_2$ generally is at least 65–75% 1-oxo-2-nitratocycloalkane, corresponding to the cycloalkene employed as starting material. However, this material may be further purified by washing with water at 25° to 50° C. and subsequently distilling the washed oil at pressures below 1 mm. of mercury absolute.

The cycloalkenes which may be employed in the process of this invention include cyclopentene, cyclohexene, cycloheptene, and the alkyl derivatives of these cyclic alkenes, such as methyl cyclopentenes, methyl cyclohexenes, and methyl cycloheptenes, and other alkyl derivatives in which one, two, or three substituent groups occur on each ring and in which the alkyl substituent may contain from 1 to 20 carbon atoms. The process of this invention is illustrated by the following example which, however, is not intended to be limiting on the invention as described hereinabove.

Example 1

A 1-liter, round-bottomed glass reaction flask was fitted with an efficient stirrer and 75 ml. of cyclohexane was added. There was then added and dissolved in the cyclohexane 60 ml. (90 g.) of nitrogen dioxide which was substantially free of nitrogen trioxide. The flask and contents were partially immersed in a cooling bath and the temperature in the flask was allowed to fall to the region of about $-5°$ C. Then, a fine stream of air, approximately 100 ml. per minute, was admitted to the flask below the liquid surface and maintained throughout the subsequent reaction. A mixture or 65 ml. (52 g.) of cyclohexene in 65 ml. cyclohexane was added to the flask containing the solution of nitrogen dioxide at such a rate as to establish a reaction temperature in a range of 0° to $+5°$ C. A cold bath temperature of about $-40°$ C. allowed this addition to take place in about 20 minutes.

When all of the cyclohexane solution had been added, and while an excess of $NO_2$ was still present, the temperature was raised to about 25° C. and the air flow was increased to 500 ml. per minute for about 10 minutes. Then, the phases were allowed to separate and the lower layer was removed to a flask suitable for vacuum application. The upper layer contained about 4% of the 2-nitratocyclohexanone. It can be recycled in a continuous process for immediate reuse. A pressure of about 20 mm. of mercury absolute was established on the crude product and the temperature held at 30° C. until the bulk of the nitrogen dioxide had distilled.

The degassed crude product had a green color and weighed about 107 g. It analyzed about 66% by weight 2-nitratocyclohexanone.

For purification, this material was mixed rapidly and thoroughly with about 100 ml. water at about 25° C. and the oil layer was separated and rewashed with another 100 ml. of water at 50° C. The mixture was cooled and the layers separated.

Eighty grams of the washed oil was distilled through a simple low-efficiency, all-glass distillation assembly at 0.3 mm. of mercury absolute. There was obtained about 2½ g. of foreshot which contained some of the desired product and the main fraction was distilled at 78–92° C. at 0.3 mm. of mercury, and weighed 61 g. This consisted of about 90% 2-nitratocyclohexanone. A fraction of high purity was obtained by redistilling.

When thus redistilled, the 2-nitratocyclohexanone was a very pale, golden yellow, water-insoluble oil which crystallized with difficulty on standing to a crystalline soid having a distinctive odor reminiscent of an alkali hypochlorite. The oil has a density of 1.238 g. per milliliter at 30° C. and a refractive index $\eta_D 25° = 1.4716$ in a supercooled condition. The freezing point of this solid is approximately 27° C. and the boiling point is about 63° C. at 0.1 mm. of mercury, and 83° C. at 0.5 mm. of mercury absolute. Upon analysis, 8.87% nitrogen, 45.5% carbon, and 5.66% hydrogen were found as compared to the theoretical values of 8.80% nitrogen, 45.3% carbon, and 5.50% hydrogen. The product has a distinctive infrared spectrum and characteristic absorption bands at 5.75, 6.1, 7.65, 7.85, 9.75, 11.25, and 11.65 microns.

The 1-oxo-2-nitratocycloalkanes are useful for preparation of dicarboxylic acids by nitric acid oxidation which process is described in a copending application S.N. 152,643 filed by W. J. Arthur and J. O. White on November 15, 1961. The 1-oxo-2-nitratocycloalkanes are also useful for conversion to the 1,2-dione by reaction with strong alkali as disclosed in copending application S.N. 152,646, filed by W. J. Arthur on November 15, 1961. The chemical structure of the 1-oxo-2-nitratocycloalkanes is illustrated by the structure of 2-nitratocyclohexanone which is shown as the reaction product in the following equation:

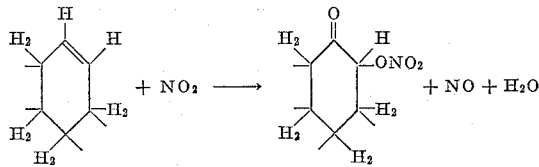

The process of this invention is applicable to other cyclohexenes in which one or more of the R groups is an alkyl radical.

I claim:

1. A process for the preparation of 1-oxo-2-nitratocycloalkanes which comprises mixing a cycloalkene with $NO_2$ in a saturated hydrocarbon reaction medium at a temperature in the range of $-15°$ to $+25°$ C. and separation of the product of the reaction, the corresponding 1-oxo-2-nitratocycloalkane in the resulting immiscible lower liquid layer.

2. A process for the preparation of 2-nitatocyclohexanone which comprises mixing cyclohexene with $NO_2$ in a saturated hydrocarbon reaction medium at a temperature in the range of $-15°$ to $+25°$ C. and separation of the product of the reaction, 2-nitratocyclohexanone, in the resulting immiscible lower liquid layer.

3. A process for the preparation of 2-nitratocyclohexanone which comprises adding a solution of cyclohexene in a saturated hydrocarbon reaction medium to a solution of $NO_2$ in another portion of the saturated hydrocarbon reaction medium at a temperature in the range of $-15°$ to $+25°$ C. and separation of the product of the reaction 2-nitratocyclohexanone, in the resulting immiscible lower liquid layer.

4. A process according to claim 3 in which the saturated hydrocarbon reaction medium is cyclohexane.

5. A process according to claim 3 in which a stream of air is bubbled through the solution of $NO_2$ during the addition of the solution of cyclohexene.

6. A process for the preparation of 2-nitratocyclohexanone which comprises: (1) adding a solution of cyclohexene in a saturated hydrocarbon reaction medium to a solution of an excess of $NO_2$ in another portion of the hydrocarbon reaction medium while maintaining the temperature of the reacting mixture in the range of $-5°$ to $+5°$ C. and while bubbling a stream of air through the reacting mixture; (2) raising the temperature of the reacting mixture to 25° C. and increasing the air flow for about ten minutes; (3) stopping the air flow and permitting the phases to separate into an upper hydrocarbon layer and a lower layer consisting essentially of a solution of $NO_2$ in 2-nitratocyclohexanone; and (4) recovering 2-nitratocyclohexanone by stripping off $NO_2$ under reduced pressure, washing the residue with water, and distilling the washed product under a pressure of less than 1 mm. of merucry, absolute.

7. A process according to claim 6 in which the saturated hydrocarbon reaction medium is cyclohexane.

8. The compound, 2-nitratocyclohexanone.

No references cited.